United States Patent [19]
Jewett et al.

[11] Patent Number: 5,687,724
[45] Date of Patent: Nov. 18, 1997

[54] APPARATUS AND METHOD FOR DETERMINING VARIATIONS IN MEASURED PHYSICAL PARAMETERS OF SIGNAL-GENERATORS

[75] Inventors: Don Lee Jewett, Mill Valley; Zhi Zhang, San Francisco, both of Calif.

[73] Assignee: Abratech Corporation, Sausalito, Calif.

[21] Appl. No.: 377,281

[22] Filed: Jan. 23, 1995

Related U.S. Application Data

[63] Continuation-in-part of Ser. No. 143,461, Oct. 26, 1993, abandoned.
[51] Int. Cl.$^6$ ........................................................ A61B 5/05
[52] U.S. Cl. ........................ 128/653.1; 324/244; 128/731
[58] Field of Search ........................... 128/653.1, 731; 324/244, 260, 248, 245

[56] References Cited

U.S. PATENT DOCUMENTS

| | | | |
|---|---|---|---|
| 4,328,809 | 5/1982 | Hirschowitz et al. | 128/653.1 |
| 5,027,819 | 7/1991 | Crum | 128/653.1 |
| 5,170,119 | 12/1992 | Sekihara et al. | 128/653.1 |
| 5,220,921 | 6/1993 | Ferris et al. | 128/653.1 |
| 5,307,807 | 5/1994 | Valdes Sosa et al. | 128/653.1 |
| 5,313,944 | 5/1994 | Crowley et al. | 128/653.1 |
| 5,417,211 | 5/1995 | Abrham-Fuchs et al. | 128/653.1 |
| 5,458,142 | 10/1995 | Farmer et al. | 128/653.1 |
| 5,526,811 | 6/1996 | Lypchuk | 128/653.1 |

OTHER PUBLICATIONS

Zhang, Zhi; Jewett, Don L. "Insidious errors in dipole parameters at a single time–point due to model misspecification of number shells," *Electroencephalography and clinical Neurophysiology* 88:1–11 (1993).

Zhang, Zhi; Jewett, Don L.; Goodwill, Gilbert. "Insidious Errors in Dipole Parameters Due to Shell Misspecification Using Multiple Time–Points," *Brain Topography* 6(4): 283–298 (1994).

Scherg, Michael. "Spatio–temporal modelling of early auditory evoked potentials," *Revue de Laryngologie* 105(2): 163–170 (1984).

Scherg, Michael; Von Cramon, Detlev. "Two Bilateral Sources of the Late AEP as identified by a Spatio–Temporal Dipole Model," *Electroencephalography and clinical Neurophysiology* 62: 32–44 (1985).

Scherg, Michael; Von Cramon, Detlev. "Evoked Dipole Source Potentials of the Human Auditory Cortex," *Electroencephalography and clinical Neurophysiology* 65: 344–360 (1986).

Turetsky, Bruce; Raz, Jonathan; Fein, George. "Representation of multi–channel evoked potential data using a dipole component model of intracranial generators: application to the auditory P300," *Electroencephalography and clinical Neurophysiology* 76: 540–556 (1990).

Martin, William H. et al. "The 3–channel Lissajous' trajectory of the auditory brain–stem response. II. Methodology," *Electroencephalography and clinical Neurophysiology* 68: 327–332 (1987).

Press, William H. et al. "Singular Value Decomposition," *Numerical Recipes in C*, Cambridge University Press, Cambridge, pp. 60–72 (1988).

(List continued on next page.)

*Primary Examiner*—Brian L. Casler
*Attorney, Agent, or Firm*—Virginia H. Meyer

[57] ABSTRACT

The present invention encompasses apparatus and methods for determining variations in estimated signal-generator parameters derived from signals created by signal-generators, such as signal-generators within organs of the body, such as brain, head, spinal cord, and muscles. The present invention is particularly useful when more than one signal generator is non-zero in part or all of the time-interval analyzed. The parameters of a signal-generator that may be of interest include, but are not limited to, magnitude, location, and/or orientation, over single or multiple points in time.

34 Claims, 6 Drawing Sheets

OTHER PUBLICATIONS

Zhang, Zhi; Jewett, Don L. "Model Misspecification Detection by Means of Multiple Generator Errors, Using the Observed Potential Map," *Brain Topography* 7(1): 29–39 (1994).

Mosher, John C.; Lewis, Paul S.; Leahy, Richard M. "Multiple Dipole Modeling and Localization from Spatio-Temporal MEG Data," *IEEE Transactions on Biomedical Engineering* 39(6): 541–557 (1992).

De Munck, J.C. "The estimation of time varying dipoles on the basis of evoked potentials," *Electroencephalography and clinical Neurophysiology* 77: 156–160 (1990).

APPARATUS AND METHOD FOR DETERMINING VARIATIONS IN MEASURED PHYSICAL PARAMETERS OF SIGNAL-GENERATORS

CROSS-REFERENCE

The present application is a continuation in-part of U.S. Ser. No. 08/143,461 filed Oct. 26, 1993, now abandoned, the contents of which are incorporated by reference herein.

GOVERNMENT RIGHTS

This invention was made with government support under grant number NIH-2 R01-DC00328 awarded by the National Institutes of Health. The government has certain rights in the invention.

TECHNICAL FIELD

The invention relates generally to signals such as electrical potentials or magnetic fields, generated by physiological functions of body organs, which act as signal-generators, such as brain, spinal cord, heart, muscle, etc., and are recorded over multiple data channels, wherein the recorded data yields information concerning the physical parameters, such as location, orientation, and time-varying magnitude of the bodily signal-generators. More specifically, this invention relates to estimation of the signal-generator parameters (e.g. magnitude over time, location, orientation) when the signals have been recorded over time-intervals in which at least part of the time the magnitudes of two or more signal-generators are non-zero.

BACKGROUND

It is often desirable or essential to measure the electrical or magnetic activity of an internal organ by detecting such activity at a distance from that organ, often at the skin surface. According to one method of present practice, if the internal organ is some part of the brain related to a sensory system, then it is possible to detect signals in the form of electrical potentials, as shown in FIG. 1, by means of electrodes (110) on the skin, signal conditioning amplifiers (111), and a conventional averaging computer (112) which commonly contains an analog-to-digital converter. The signals recorded in this way can be used to determine the physical properties of the signal-generators. However, there can be considerable difficulties in determining accurately the physical parameters of two or more signal-generators if each signal-generator is active during part or all of the period analyzed and thus each signal-generator contributes to some or all of the measurements taken. These estimated physical parameters (such as location, orientation, and/or magnitude) may also be in error during a part of the time-interval analyzed even when only a single signal-generator has a non-zero magnitude if there is another part of the time-interval in which there are one or more other signal-generators with non-zero magnitudes.

In order to distinguish and separate the magnitudes of two or more simultaneously-active signal-generators, or to determine other parameters of single or multiple signal-generators, it is necessary to process the recorded signals. Such processing can include an iterative search for an optimum set of signal-generator parameters which minimize some function, such as the least-square error between the recorded signals and signals predicted from a "model". A flowchart for one version of such an iterative search is shown in FIG. 2. Initially, it is necessary to position electrodes and then record and store the signal-matrix from such electrodes, as shown in steps 201 and 202, FIG. 2. The recorded signal-matrix is then compared with a matrix predicted from a "model", based upon estimated signal parameters which initially may be arbitrarily chosen, or selected upon some user's criteria (step 203, FIG. 2). The least-square-error (LSE), is calculated according to Eq. 1. If the error is larger than a pre-selected value (step 204, FIG. 2), then another set of signal parameters is chosen, by any of a variety of conventional methods (step 205, FIG. 2), and the new parameters are used in the "model" to form a new predicted matrix (step 206, FIG. 2). The new predicted matrix is then compared with the signal-matrix (step 203, FIG. 2), and the loop of steps 204, 205, 206, 203 is iteratively traversed until the least-square-error is within tolerance at step 204, (FIG. 2), at which point the results are stored and displayed (step 207, FIG. 2).

In such an iterative search, the "model" is some means of relating a signal-generator of unit magnitude, at a given location, orientation, and/or some other generator parameter, to the signal magnitude detected on each signal-channel. Such means can be a computation based upon geometric principles, can be a special shape-related estimation, or can even be a table look-up. For any given signal-matrix, different models can be used to determine the separate signal-generator magnitudes, or other signal-generator parameters, even though the signal-generators are simultaneously active. Such different models may provide different signal-generator parameters from the same signal-matrix, which means that some of the models must be providing parameters with some degree of error. Thus, there is a need to estimate whether the estimated signal-generator parameters are likely to contain significant errors.

The success of a given model in being useful for estimating signal-generator parameters is often evaluated by comparing the model's predicted matrix with the recorded signal-matrix; a close correspondence between the two matrices, measured by the least-square error, is often taken as evidence that the analysis is "correct", i.e., that the analysis reliably estimates the magnitude, location, and orientation of the signal-generators whose algebraically-summed potentials or magnetic fields are recorded in the signal-matrix. Whenever such a computation is used, there is a presumption that the linear superposition of potentials (or fields) that occurs physically, is accurately computed in the model. However, if the model is not sufficiently accurate, i.e., if there is model misspecification, this presumption is not correct. We have shown that such misspecification in models of brain signal-generators can make the results unusable, whether the analysis is of single time-points (Zhang & Jewett, EEG clin Neurophysiol 88: 1, 1993) or multiple time-points (Zhang, Jewett, & Goodwill, Brain Topography 6:283, 1994).

To overcome some of the difficulties of single time-point methods, a spatio-temporal method has been proposed and used (Scherg, Rev. Laryngol, 105:163, 1984; Scherg and Von Cramon, EEG clin Neurophysiol 62:32, 1985; Scherg and Von Cramon, EEG clin Neurophysiol 65:344, 1986). This method utilizes multiple time-points requiring that the recorded signals are due to a few signal-generators, each of which has a fixed location and fixed orientation over the multiple time-point interval. Additional constraints may also be used (Turetsky et al. EEG clin Neurophysiol 76:540, 1990). However, no means to estimate the accuracy of such multiple-time-point methods when applied to an actual signal recording from simultaneously non-zero signal-generators, has been available until we developed our invention.

The estimated signal-generator parameters derived from analyzing signals can contain errors due both to noise and to model misspecification, or other causes. These errors are insidious because they are not otherwise detectable and can lead to misinterpretation of the results, which may have a serious consequence when the estimation of signal-generator parameters is important in medical studies, or in research. While it is obvious that the larger the signal-to-noise ratio, the better the results are likely to be, it is not obvious as to whether a given set of recorded signals, containing some unknown signal-to-noise ratio, is sufficiently accurate to be used with a given model. If the signal-to-noise ratio is extremely high, as can be achieved by activation of signal-generators composed of currents passed through electrodes, for example, then the model may appear accurate when only one signal-generator is active, but may be inaccurate when more than one signal-generator is simultaneously non-zero.

For the reasons enunciated in the foregoing paragraphs, there is need for an apparatus and a method capable of warning of probable errors that can occur when a given model is used as part of a transformation of a set of recorded signals into estimated signal-generator parameters. With such an error warning, a user can determine whether the results are sufficiently error-free for the user's purposes. The same apparatus and method can also be used to determine the adequacy of a given model when the signal-to-noise ratio is high.

SUMMARY

The present invention encompasses apparatus and methods for determining variations in estimated signal-generator parameters derived from signals created by signal-generators, such as signal-generators within organs of the body, such as brain, heart, spinal cord, and muscles. The present invention is particularly useful when more than one signal-generator is non-zero in part or all of the time-interval analyzed. The parameters of a signal-generator that may be of interest include, but are not limited to, magnitude, location, and/or orientation, over single or multiple points in time.

In accordance with certain of the many possible embodiments of the present invention, probable errors in estimated signal-generator parameters are estimated from difference-surfaces which show the variations in estimated signal-generator parameters (location, orientation, magnitude, etc.), when factors (called E and F) related to the signal-generator waveforms are varied. Apparatus and methods according to the invention can be used to estimate errors for different source-analysis methods a user may utilize to determine the estimated signal-generator parameters. Apparatus and methods according to the present invention can also be used to determine probable errors in the use of a source-analysis method with a given model, from recorded signals in which the signals are recorded for each of two or more non-zero signal-generators, whether or not their location, orientation, and magnitude are known. Apparatus and methods according to the present invention can also be used to determine probable errors in the use of a source-analysis method with a given model, from recorded signals in which each of the signal-generators is individually active over a known time interval.

In one of several embodiments of the present invention, the difference-surface can be evaluated by determining, either visually or by a numerical evaluation, whether the variations in estimated signal-generator parameters are particularly sensitive to changes in the E and F factors. This evaluation permits the user to decide whether the estimated signal-generator parameters should be accepted as sufficiently error-free for the purposes of the user. Another aspect the present invention discloses a method to reduce the errors in the estimated signal-generator parameters by computing those parameters at specific points in the EF-space.

Further aspects and advantages of the invention will become more readily apparent from the following detailed description, when taken in conjunction with the flow charts shown in the accompanying drawings.

BRIEF DESCRIPTION OF THE DRAWINGS

These and other features, aspects, and advantages of the present invention will become better understood with regard to the following description, appended claims, and accompanying drawings where:

DEFINITIONS

Figure 1:
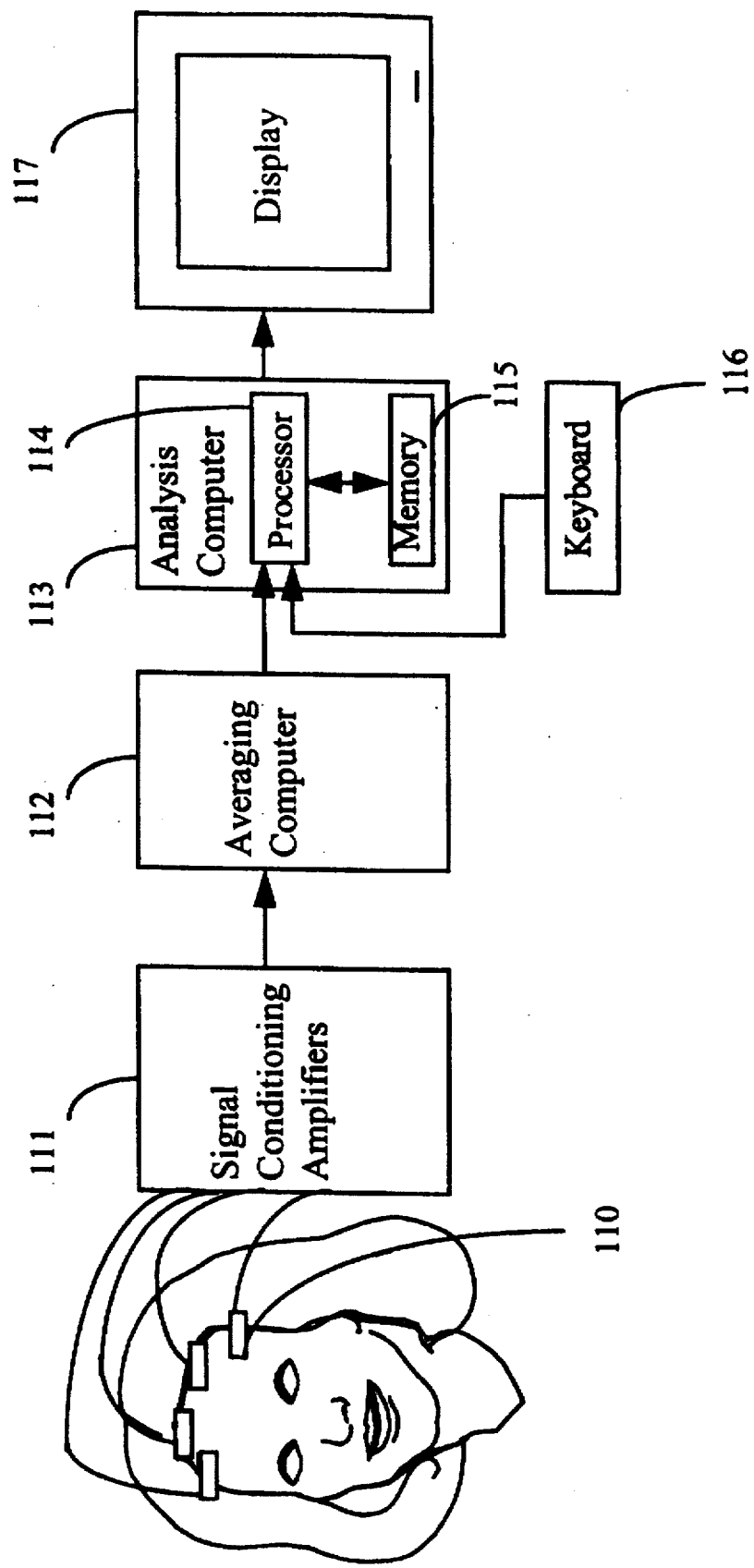
FIG. 1 shows a diagram of the incorporation of one embodiment of an apparatus according to the present invention together with other apparatuses.
Figure 2:
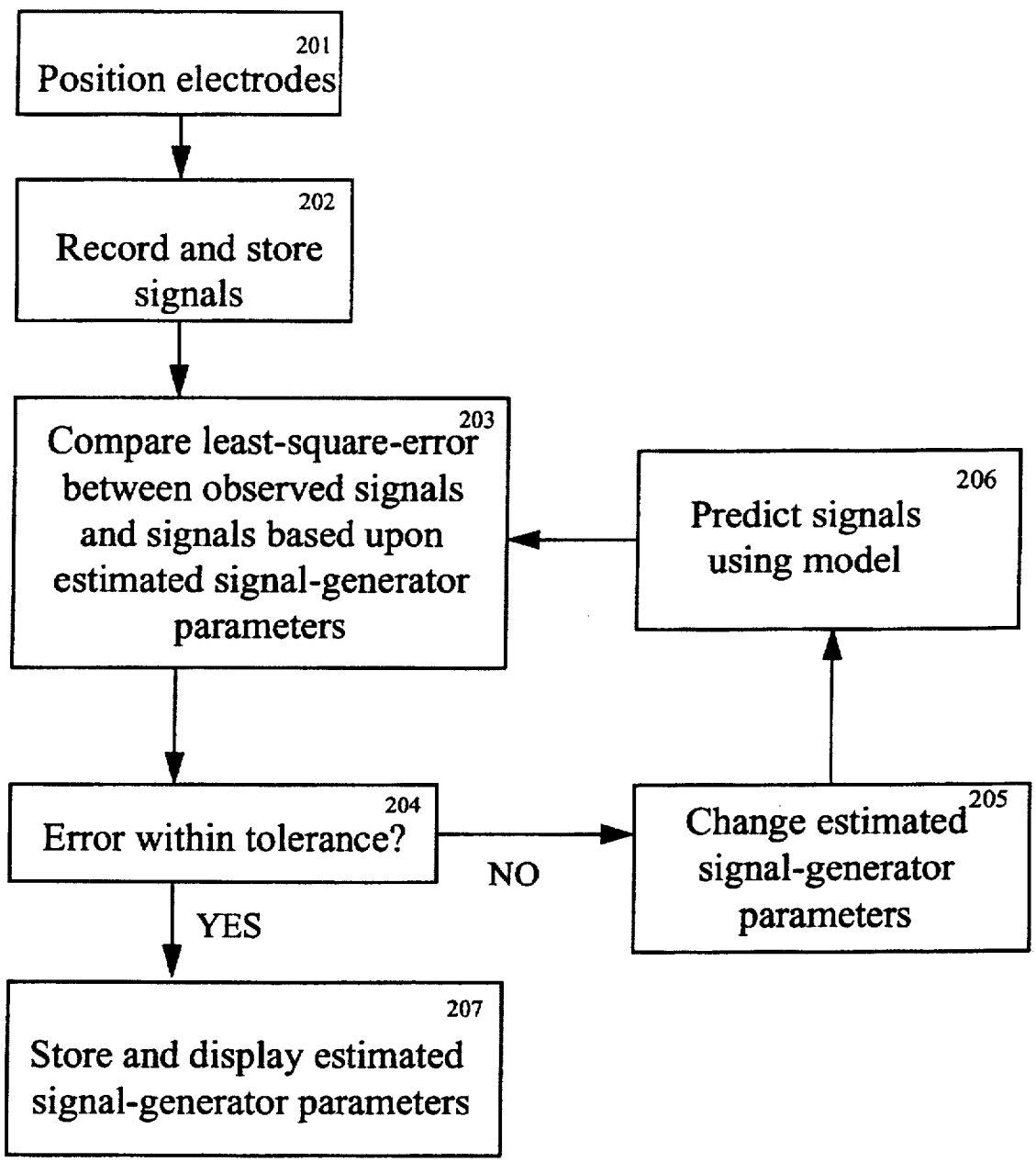
FIG. 2 shows a flowchart of process steps used to convert recorded signals obtained from several signal-channels into estimated signal-generator parameters.

In the present specification and claims, reference will be made to phrases and terms of art which are expressly defined for use herein as follows:

As used herein, channel-space means a multidimensional space formed from the number of signal-channels in use; a single point in channel-space represents the simultaneous values on all of the channels at a single point in time; and a single point in channel-space is the same as a signal-vector.

As used herein, signal-space means a multidimensional space which is a subspace of channel-space and has the number of dimensions equal to or less than the number of signal-generators. By one means, signal-space can be determined by the method of singular-value-decomposition. By another means, it can be determined visually in some cases (Martin, et al. *Electroenceph. clin. Neurophysiol.* 68:327, 1987).

As used herein, singular-value-decomposition means a computational method substantially similar to that described by Press et al., *Numerical Recipes in C*, Cambridge: Cambridge Univ. Press, 1988, p. 60.

As used herein, the words "signal channel" mean an apparatus or other means by which a signal is transmitted.

As used herein, signal-matrix means a matrix of signal values, each a number, derived from a plurality of signal channels, and a plurality of time-points. A signal-matrix can be formed from one or more signal-vectors.

As used herein, signal-vector means a vector of signal values, each a number, derived from a plurality of signal channels, at a single time-point. A signal-vector can be one column or one row of a signal-matrix.

As used herein, model means a method from which can be derived a signal-vector due to a single signal-generator of unit-magnitude, at a specific location and specific orientation, with or without additional specified characteristics, within a current-carrying medium of specified shape and electromagnetic properties, either globally or locally specified.

As used herein, signal-generator means the cause of signals, and can be either biological or non-biological. An example of a non-biological signal-generator is the signal-generator resulting from passing current between two electrodes within or attached to a biological entity.

As used herein, signal-generator parameter means physical attributes of the signal-generator, such as, but not limited to, location, orientation, magnitude, and/or time-varying magnitude. As used herein, signal-generator parameter can also refer to abstract properties of a signal-generator which are estimated by a source-analysis method.

As used herein, a difference-surface means the differences between two values, one computed at a point in the EF-space and the other a constant. A difference-surface can be computed by other means, including but not limited to differences between signal-generator parameters using different models, computed at the same EF point. The difference-surface has the same number of dimensions as the EF-space. If the EF-space is three dimensional, then the difference surface is a volume, but is still called a "surface".

As used herein, a source-analysis method means a method to transform a signal matrix into estimated signal-generator parameters. A plurality of such means are known to those of ordinary skill in the art.

As used herein, E or E-factor means a numerical value ranging from −1 to +1 which relates to and can be derived from known signal-generator waveforms by means of Eq. 12.

As used herein, F or F-factor means a numerical value ranging from 0 to +∞, which relates to and can be derived from known signal-generator waveforms by means of Eq. 12.

As used herein, EF-space is a multidimensional space whose number of dimensions is the sum of the number of E-factors and F-factors given by Eq. 6. The number of F-factors in the EF-space is N−1, and the number of E-factors is $(N^2-N)/2$, where N is the number of signal-generators.

As used herein, signal means a physical parameter caused by a signal-generator. The signal can be detected by any of a number of sensors and accompanying means. Examples of signals include, but are not limited to, electrical potentials, magnetic fields, electrical fields.

As used herein, the term apparatus includes both the singular and the plural.

As used herein, reference frame means the basis of a measurement system from which consistent measurements are referenced, including, but not limited to, the origin of three orthogonal spatial axes.

As used herein, known signal-generator means a signal-generator with one or more known signal-generator parameters.

As used herein, known signal-generator parameter means a signal-generator parameter whose numerical value is determined by some means other than an estimation from a signal-matrix.

As used herein, unknown signal-generator means a signal-generator with unknown signal-generator parameters, or a signal-generator whose known signal-generator parameters are not used in estimating signal-generator parameters.

As used herein, unknown signal-generator parameter means a signal-generator parameter whose numerical value is estimated from a signal-matrix, by means of a source analysis method.

As used herein, actual signal-generator parameters are the signal-generator parameters of an actual signal-generator, symbolized herein as $P_1$, $P_3$, and $P_x$.

As used herein, estimated signal-generator parameters are the signal-generator parameters estimated in a model by a source-analysis method or the methods of this invention, symbolized herein as $P_2$.

As used herein, signal-generator waveform means the magnitude of a signal-generator as a function of time.

As used herein, averaging computer means an apparatus which can detect and store a signal which is contaminated by noise, by repeatedly averaging analog-to-digitally converted numbers, time-locked to a repeating signal. As used herein, the term averaging computer also means any apparatus which can detect and store a signal, even without averaging, said apparatus may or may not perform processing on the inputs to the apparatus.

As used herein, signal-matrix means a matrix of numerical values derived from signals taken over multiple signal-channels, over multiple time-points.

As used herein, predicted matrix means a signal-matrix which is predicted from a source-analysis method, using a model, which is symbolized herein as $D_{y'}$.

As used herein, a flat region on a difference-surface or signal-generator parameter surface means a set of adjacent points on that surface that vary by less than a prescribed amount. The smaller the prescribed amount, the flatter the region.

A cross reference of the symbols used in this patent to those in our publications are listed in the following table:

| | Cross reference of symbols | | | | |
| --- | --- | --- | --- | --- | --- |
| | | Terms Previously Used In ‡ | | | |
| Terms Used In This Specification | USSN 08/143,461 | App.B | App.C | ZZ,DJ&GG | ZZ&DJ |
| D | recorded data-matrix | $V_{obs}$ | $V_{obs}$ | $V_{obs}$ | $V_{obs}$ |
| $D_x$ | data-matrix | $V_{obs}$ | $V_{obs}$ | $V_{obs}$ | $V_{obs}$ |

-continued

Cross reference of symbols

| Terms Used In This Specification | USSN 08/143,461 | App.B | App.C | ZZ,DJ&GG | ZZ&DJ |
|---|---|---|---|---|---|
| $D_y$ | predicted data-matrix | $\underline{V}_{fit}$ | $V_{fit}$ | $\underline{V}_{fit}$ | $V_{fit}$ |
| N | $N_{gen}$ | $N_{gen}$ | $N_{gen}(=2)$ | $N_{gen}$ | $N_{gen}$ |
| Q | | | | | $N_{gen}$ † |
| R | R | R* | | R* | $R_{CD}*$ |
| $W_1$ | | | $W_v$ s | | $W_{CD}$ |
| $W_2$ | | | | w s | $W'_{fit}$ |
| $W_3$ | | | $W_m$ s | | $W_{BF}$ |
| $W_y$ | | $\underline{W'}$ | | $\underline{W'}$ | $W'_{fit}$ |
| $\underline{M}_w$ | $\underline{M}'_w$ | $\underline{M}'_w$ | | $\underline{M}'_w$ | |
| $\underline{M}_s$ | | $\underline{M}_s$ | | $\underline{M}_s$ | |
| $P_1$ | | $d_1,d_2$ | $D_1,D_2$ | $d_1,d_2$ | $d_1,d_2$ |
| $P_3$ | G1,G2 | $\underline{d_1,d_2}$ | | $\underline{d_1,d_2}$ | |
| $P_x$ | G'1,G'2 | $\underline{d_1',d_2'}$ | | $\underline{d_1',d_2'}$ | |
| E | A | A* | C,E* | A* | C,E* |
| F | B | B* | D,F* | B* | D,F* |
| W-vector | weighting-coefficents | | | | |
| Difference-surface | MulGenEerr-surface* | | | | Δ-surface |
| Location_Difference | | LE* | | | ΔLocation |
| Orientaion_Difference | | OE* | | | |
| Magnitude_Difference_Matrix | | IM | | | $\hat{M}$ |

*substantially similar.
† number of dimensions of signal-space is assumed equal to the number of generators.
‡ Citations for preceding table:
App.B is Appendix B in USSN 08/143,461, which is a pre-publication manuscript for Zhang, Jewett, & Goodwill, Brain Topography 6:283, 1994
App.C is Appendix C in USSN 08/143,461, which is a pre-publication manuscript for Zhang, Jewett, & Goodwill, Brain Topography 6:283, 1994
ZZ,DJ&GG is Zhang, Jewett, & Goodwill, Brain Topography 6:283, 1994
ZZ&DJ is Zhang & Jewett, Brain Topography 7:29, 1994

DESCRIPTION

This invention may be implemented by carrying-out the processes described herein on a computer electronically hardwired for this purpose. Alternatively, and in the presently-preferred version, the processes are performed by a special purpose analysis computer 113, as shown in FIG. 1, formed from a general purpose computer specifically programmed to carry out the steps described in the flowcharts of FIGS. 3–6. In FIG. 1, the averaging computer 112 and the analysis computer 113, can be either contained physically in the same equipment, or can be physically distinct. If distinct, the communication of either analog or digital signals between the averaging computer 112 and the analysis computer 113 can be by any of a plurality of means, including, but not limited to, electronic transfer by direct connection, or over remote connections, including modems and telephone lines, or further including transfer by digital disks or diskettes, or by manual entry via keyboard (116 in FIG. 1).

Within the analysis computer 113, there is a central-processor unit means 114 and a memory means 115. The analysis computer 113 may provide, among a plurality of outputs, a display 117. In accordance with the present invention, the display 117 can be used to display the variation of estimated signal-generator parameters as determined by the method of the present invention, or to display results derived from such variations.

Figure 3:
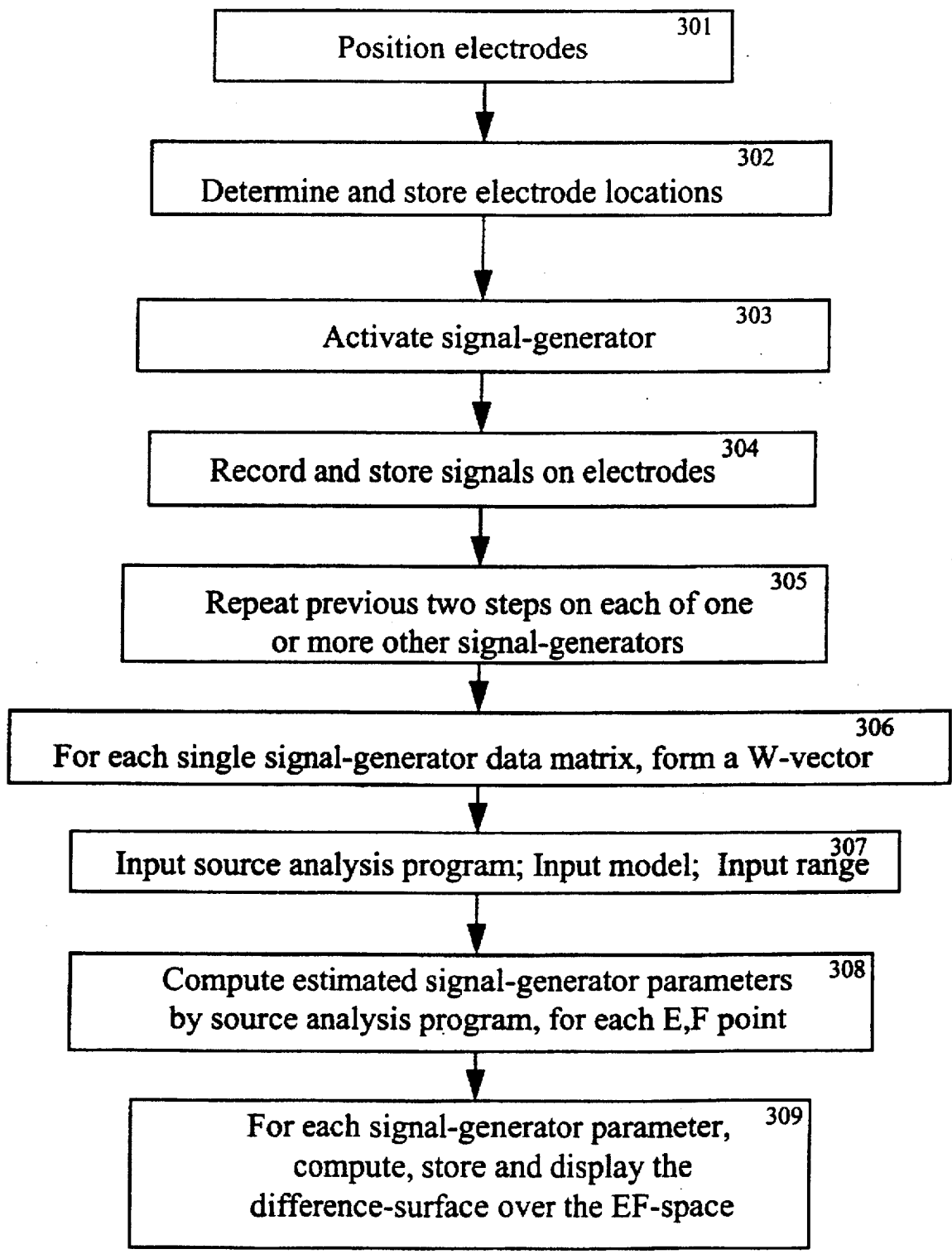
FIG. 3 shows a flowchart of process steps used to estimate probable errors in estimated signal-generator parameters when the signals are recorded separately from each of two or more signal-generators, whether or not the signal-generator parameters are known.
Figure 4:
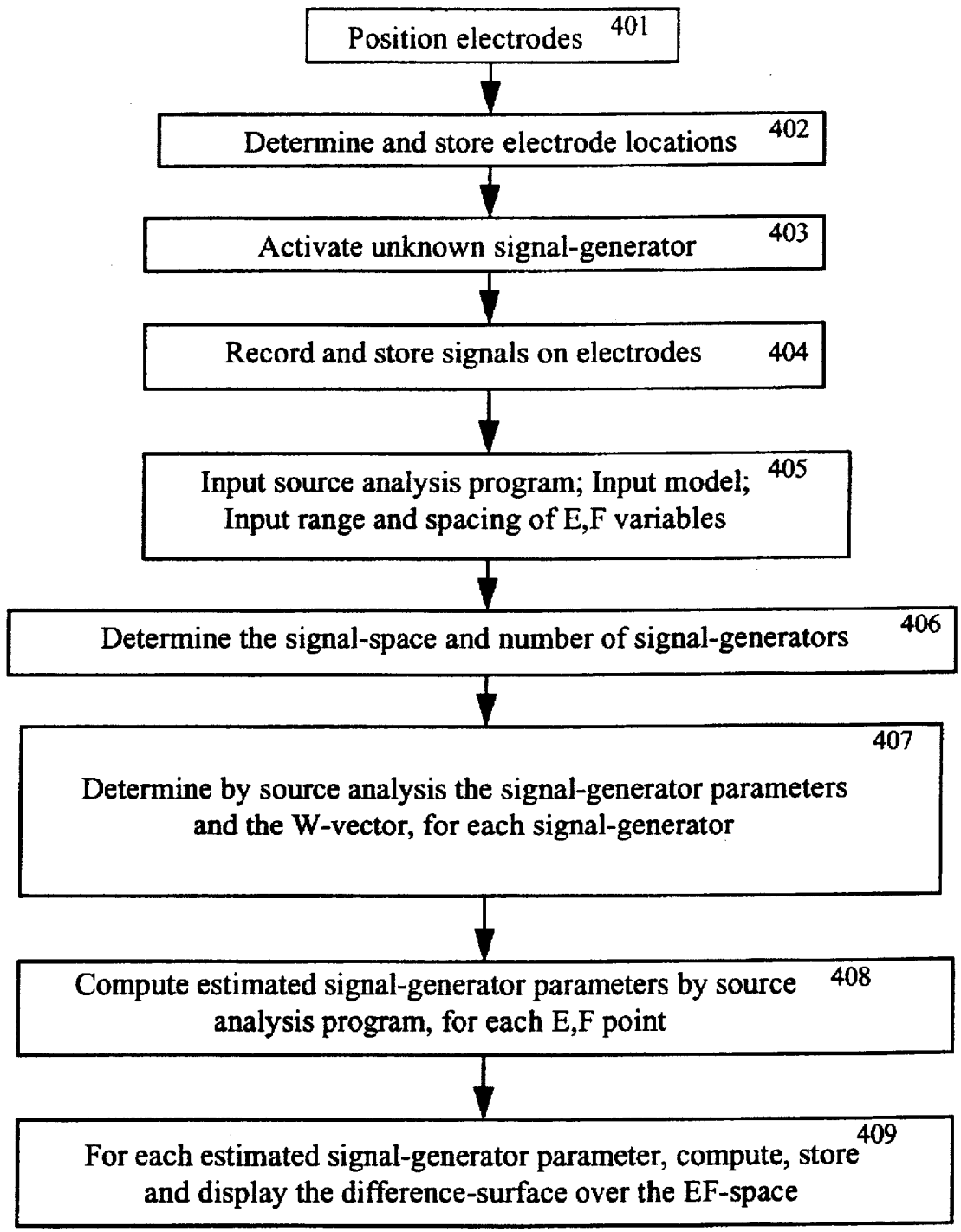
FIG. 4 shows a flowchart of the process steps used to estimate probable errors in estimated signal-generator parameters by means of variations in estimated signal-generator parameters as a function of points in EF-space, when the data-channels record from two or more unknown signal-generator sources.

The steps used to practice various embodiments and aspects of the invention are outlined in FIGS. 3–6. In FIG. 4 is shown a flowchart which outlines the process steps needed to determine probable errors in estimated signal-generator parameters (by means of variations in the estimated signal-generator parameters as a function of points in EF-space) when signals are recorded in which two or more unknown signal-generators have a non-zero magnitude during at least part of the time-interval analyzed. FIG. 3 shows a flowchart which outlines the process steps used to determine errors in the estimated signal-generator parameters when signal-vectors or signal-matrices are recorded separately for each of two or more non-zero signal-generators. The process steps of FIG. 3 can be used in situations including, but not limited to, those where it is useful to evaluate the probable errors of a specific model, such evaluation being accomplished from a difference-surface derived from signal-generators composed of electrical currents passed through electrodes on the body surface, or within the body, where the signal-to-noise ratio can be extremely high, or from biological signal-generators whose activity is recorded separately. In either of these two cases, the actual signal-generator parameters may or may not be known.

The steps of FIG. 3 will be described first since several of the aspects of the invention are more easily understood in this simpler case. The more complicated case in FIG. 4 will then be described. In FIG. 3, first the recording means must be positioned (step 301, FIG. 3), and the method of recording the signals made operational. The recording means can be any of a plurality of signal-recording devices, including but not limited to electrodes, magnetic-field detectors, and/or electric-field detectors. The positioning of the recording means is determined by the user, based upon any of a plurality of factors, including, but not limited to, the physical structure of the recording devices, standard placements known in the art, locations in devices used to hold the electrodes, and/or positions that are preferred when recording from specific signal-generators. After positioning, the spatial locations of the signal-recording means must be determined and stored (step 302, FIG. 3), such locations being determined by any of a plurality of conventional methods. The locations must then be transferred to the model, as described later. Storage of the locations can be by any of a plurality of conventional methods, so long as the locations are available to the analysis computer during steps in which the locations are utilized.

The next step is to activate the signal-generator (step 303, FIG. 3). This activation can occur by any of a plurality of means, depending upon the nature of the signal-generator, including, but not limited to, providing a known current and/or voltage to a pair of electrodes, providing a known magnetic field by means of an current-carrying coil, providing a sensory stimulus which will cause activity in some part of a bodily organ, and natural or random activation in which the change in activity of the signal-generator is detected by some means (such as another detectable event, or the absence of an expected event, or a detection means placed near the signal-generator). If any of the signal-generator parameters are known, they are also input, being the signal-generator parameters $P_1$ used subsequently in steps 308 and 309 (FIG. 3).

The signals on the signal-channels are then recorded and stored (step 304, FIG. 3). A signal can be any of a plurality of analog or digital signals, including, but not limited to, electrical potentials, magnetic-fields, and/or electrical-fields. The signals may be recorded at a single time-point or over a number of time-points. If the signal is recorded at a single time-point, then the signal recorded is a signal-vector. If the signal is recorded over time, then the recorded signal is a signal-matrix. Storage of the signal-vector or signal-matrix can be by any of a plurality of methods, so long as the signal-vector or signal-matrix is available to the analysis computer during steps in which the signals are utilized. Since the signal-vector or signal-matrix is from only a single signal-generator in this case, then steps 303 and 304 (FIG. 3) must be repeated for each of two or more single signal-generators (step 305, FIG. 3).

For each of the N single signal-generators to be used in the invention, a W-vector is formed (step 306, FIG. 3). For the case where the signal is a signal-vector, then that signal-vector becomes the W-vector for that signal-generator. For the case where the signal is from multiple time-points, the W-vector can be taken as the eigenvector of the largest eigenvalue computed from singular-value-decomposition of the signal-matrix, or by using means, including but not limited to, to take the average mean over time, or take the median value, or take some other value which provides an estimate of the W-vector for that signal-generator.

Each of the N W-vectors may or may not be normalized, depending upon the user's choice. The normalization may improve the ability to detect differences in signal-generators when their signal magnitudes are significantly different. The normalization may also improve estimation of signal-generator parameters, as described later. Two of the plurality of possible ways to normalize the W-vectors are as follows: 1) to normalize the W-vectors to be the same length for all the signal-generators; 2) to utilize the model, scaling the W-vectors such that the individually-estimated signal-generators all have unit-magnitude. If other methods of normalization are used, the invention described here will still function as described. The N such W-vectors, whether normalized or not, are then formed into an $N_{chn} \times N$ matrix W for step 308, and $N_{chn}$ is the number of signal-channels. Each W-vector is one column of the W-matrix.

Step 307 (FIG. 3) indicates the input by means of the keyboard (116 in FIG. 1), or by other means, of several user-selected programs or values. The source analysis method can be any of a plurality of conventional methods, including, but not limited to Scherg's method (described in the Background section above). For purposes of the present invention, the method should be based upon a criterion yielding substantially similar results to those obtained by minimizing the least-square error (LSE) between the matrix $D_x$ and the predicted-matrix $D_y$ by the model, as follows:

$$LSE=C\|D_x-D_y\|^2+Z \qquad \text{Eq. 1}$$

where C is a non-zero, positive number and $D_x$ is the analyzed matrix which can be the recorded signal-matrix D, or some other derived matrix (such as the $D_x$ given in Eq. 7), and Z is any function of the signal-generator parameters, or of the W-vectors, or of any other variable, with the exception of a variable dependent upon either the signal-generator magnitude or the recorded signal-matrix. A number of such methods are well-known to those of ordinary skill in the art.

The methods and apparatus of the present invention can be used with any model, the model being specified by the user in step 307 (FIG. 3), and when so used, the invention provides information on errors or variations of the estimated signal-generator parameters, that are specific to the model specified. Examples of models presently used or that could be used include: 1) a homogeneous sphere, ellipsoid or spheroid; 2) a sphere, ellipsoid or spheroid with multiple shells that are either concentric or eccentric, each shell with either anisotropic or isotropic, homogeneous conductivity; 3) a sphere, ellipsoid or spheroid with either anisotropic or isotropic nonhomogeneous conductivity; 4) head shapes with or without multiple shells, each shell with either anisotropic or isotropic, homogeneous or nonhomogeneous conductivity; 5) torso shapes with or without similar multiple shells, each shell with either anisotropic or isotropic, homogeneous or nonhomogeneous conductivity; 6) cylindrical shapes with or without multiple shells, each shell with either anisotropic or isotropic, homogeneous or nonhomogeneous conductivity. The model is used to determine estimated signal-generator parameters at one or more later steps. The model can be in the form of equations, or a table look-up, or any other means which supplies a predicted signal-vector output for an input of a given set of signal-generator parameters, including, but not limited to, location and orientation. A specific example of a multi-shell spherical model is given in Zhang and Jewett (supra). The signal-generators utilized in the model can be of any kind (e.g., electric dipoles, electric quadrupoles, finite dipoles, magnetic dipoles, dipole sheets, etc.), as long as linear superposition holds, and the signal at the recording means is proportional to the signal-generator magnitude. An example of a model using magnetic fields and magnetic dipoles is given in Mosher, et al., (IEEE Trans Biomed Eng. BME-39:541, 1992).

It is necessary to specify the measurement locations actually used to record the signal-vectors or the signal-matrix (step 302, FIG. 3), including any measurement locations used as a reference (i.e., a measurement location which is attached to one side of a differential amplifier which provides the magnitude of a signal detected on one input, as compared with the reference input). After recording, the signal-vector or signal-matrix can also be re-referenced to an "average reference" or some other electrode or electrodes, so long as the same process is carried out in the source analysis method. The measurement locations are transformed to the reference frame of the model, in accordance with the physical properties of the shape being modeled. For example, if the signals are recorded in a head shape, but the model is spherical, then the locations of the measurement points on the head are transformed on the sphere, based upon user-defined rules such as using a sphere that is the best-fit to the electrodes located in three-dimensional physical space, and locations are placed on the surface having been moved from the head shape locations along radii that pass through the locations on the head shape and reach the sphere surface.

In step 307, FIG. 3, a region of the EF-space is chosen by the user. This choice is based upon various factors, including, but not limited to, previous experience, the amount of computer time available, the accuracy needed, and the generator magnitude ratios of interest. An E factor can range from −1 to +1, while an F factor can range from 0 to +∞. The F factor range must be chosen. Since the F factor is a function of the relative magnitudes of the signal-generators, it can be limited to the range in which the relative magnitudes are significant, e.g., from 0.1 to 10 if ratios of greater than 10 to 1 between signal-generator magnitude are not of significance to the user. In the case of brain evoked potentials, a range of F from 0.1 to 10 can be sufficient after the W-vectors are normalized as described in step 306 (FIG. 3). There is probably no advantage in computing values of F outside of the range of interest of the user. However, there can be an advantage in computing the E variables at their absolute maxima, since this corresponds to the results when the signal-generator magnitudes are 100% correlated (positively or negatively), which is identical with the results when the model has been solved for simultaneously-non-zero signal-generators at a single time-point. Alternatively, if the model only uses single time-points, then the computational points in the EF-space can be limited to those where the E's are equal to +1 or −1.

Figure 5:
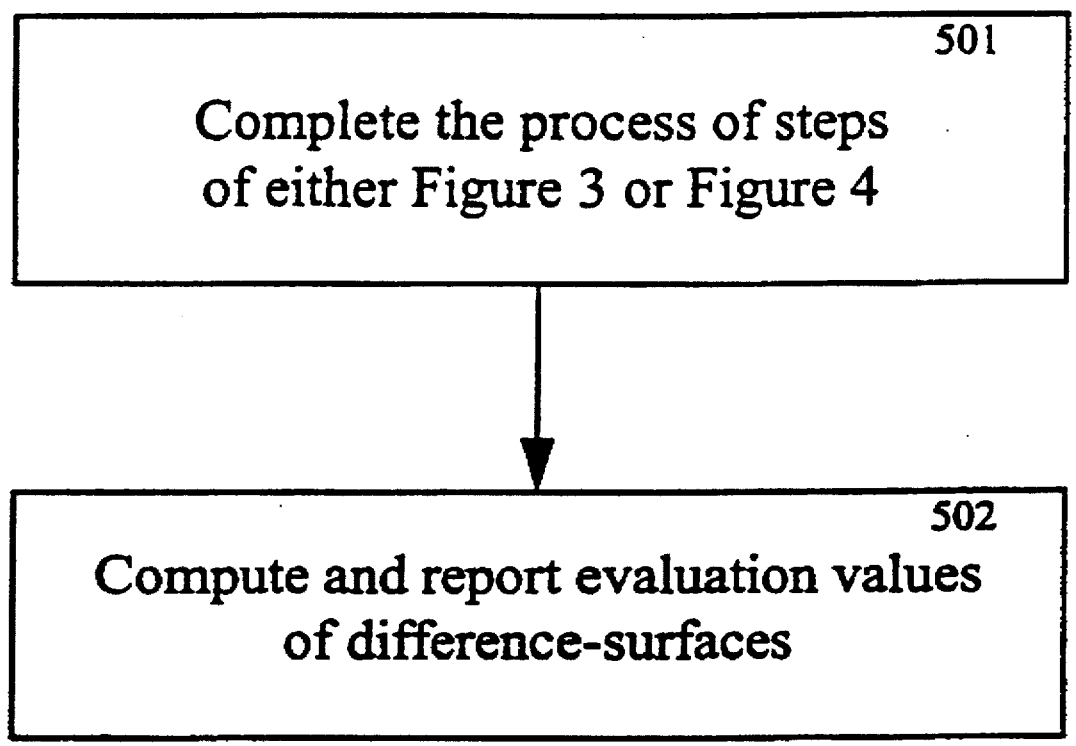
FIG. 5 shows a flowchart of the process steps used in order to carry out a quantitative evaluation of the difference-surface.

In step 307 (FIG. 3), the spacing of the points to be analyzed in the EF-space is chosen. This can be uniform, or non-uniform, depending upon the user's choice, and may be chosen in conjunction with a specific numerical evaluation in step 502 (FIG. 5). The choice of points to calculate in the EF-space may be affected in other ways by the intended evaluation, as there are a plurality of ways to evaluate a given difference-surface, as described for step 309 (FIG. 3). The choice of a range of values for E and F, together with a choice of spacing, specifies a set of points in the EF-space, which will be used in subsequent steps.

In step 308 (FIG. 3), for each of the points in the EF-space that have been specified in step 307, a series of computations is done, as described in the following 3 steps:

Step 308a. Compute the numerical values of the R matrix. The R matrix is model-independent, and generator-type-independent. The derivation of the R matrix is given here, where $\theta_{ij}=\cos^{-1}E_{ij}$. Assume the component of R is $R_{ij}=F_jf_{ij}$ for $j \geq i$ and $R_{ij}=0$ for $j<i$, then Eq. 2 and Eq. 3 can be used iteratively to work out all the $r_{ij}$, for a given N, the number signal-generators.

$$r_{ii} = \sqrt{1 - \sum_{k=1}^{i-1} r_{ki}^2} \quad (i=1,2,\ldots,N) \qquad \text{Eq. 2}$$

-continued $$r_{ij} = \frac{E_{ij} - \sum_{k=1}^{i-1} r_{ki}r_{kj}}{r_{ii}} \quad (j>i) \qquad \text{Eq. 3}$$

In the case where N=2, then the R matrix is as shown in Eq. 4.

$$R = \begin{bmatrix} 1 & F_2\cos\theta_{12} \\ 0 & F_2\sin\theta_{12} \end{bmatrix} \qquad \text{Eq. 4}$$

In the case where N=3, the R matrix is as shown in Eq. 5.

$$R = \begin{bmatrix} 1 & F_2\cos\theta_{12} & F_3\cos\theta_{13} \\ 0 & F_2\sin\theta_{12} & F_3\dfrac{\cos\theta_{23} - \cos\theta_{12}\cos\theta_{13}}{\sin\theta_{12}} \\ 0 & 0 & F_3\dfrac{\sqrt{[\cos(\theta_{12}-\theta_{13}) - \cos\theta_{23}][\cos\theta_{23} - \cos(\theta_{12}+\theta_{13})]}}{\sin\theta_{12}} \end{bmatrix} \qquad \text{Eq. 5}$$

The R matrix can be extended to a larger number N using Eq. 2 and Eq. 3. The number of E and F variables in the R matrix determines the dimensions of the EF-space, this number is a function of the number of signal-generators N, and is given by DIM(N) in Eq. 6.

$$\text{DIM}(N) = \frac{(N-1)(N+2)}{2} \qquad \text{Eq. 6}$$

Step 308b. An $N \times N_{ch n}$ matrix $D_x$ is formed using the R matrix and the W-matrix, as follows:

$$D_x = RW^T \qquad \text{Eq. 7}$$

Step 308c. $D_x$ is analyzed using a user-selected source analysis method by minimizing the LSE of Eq. 1, to determine simultaneously the N sets of estimated signal-generator parameters $P_x$. In those cases in which the estimated signal-generator parameters are determined by an iterative search process, then the starting signal-generator parameters may be the known parameters $P_1$ so as to shorten the iterative search and reduce the likelihood of being trapped in a local minimum. In order to reduce the likelihood of being trapped in a local minimum when $P_1$ is not known, the following steps may be used. Analyze each of the N W-vectors (each of the N columns of W) separately to determine the estimated signal-generator parameters for each signal-generator. Denote the estimated parameters as $P_3$, then $P_3$ can be used in place of $P_1$.

In step 309 (FIG. 3) the difference-surface is determined, being the differences between $P_x$ for each point computed on the EF-space and $P_1$ or $P_3$. When $P_1$ are known, these differences are the errors. The differences are computed by any method the user may choose. The differences can be chosen to be those in location, orientation, magnitude, or any signal-generator parameter computed by the source analysis method whose variation has been analyzed by means of the invention, or any combination thereof. In the presently-preferred mode, the location differences are computed by means of the Euclidean distance between the two locations:

$$\text{Location\_Difference}(i) = |r_x(i) - r_y(i)| \quad i=1, 2, \ldots N \qquad \text{Eq. 8}$$

where $r_x(i)$ is the location parameters for the i-th signal generator in $P_1$ or $P_3$, and $r_y(i)$ is the estimated location parameters for the same signal generator.

In the presently-preferred mode, the orientations are computed by means of the included angle between the two orientations:

$$\text{Orientation\_Difference}(i) = \cos^{-1}(e_x(i) \cdot e_y(i)) \qquad \text{Eq. 9}$$

where $e_x(i)$ is the orientation of the i-th signal generator in $P_1$ or $P_3$, and $e_y(i)$ is the estimated orientation for the same signal generator.

In the presently-preferred mode, the magnitudes are computed according to the matrix wherein the influence of each signal generator upon the others is distinguished from the effects of each signal generator upon its own magnitude:

$$\text{Magnitude\_Difference\_Matrix} = M_s^{-1} M_w - I \qquad \text{Eq. 10}$$

where I is an N×N identity matrix, $M_s$, is an N×N diagonal matrix, with $(M_s)_{ij}$ being the magnitude of the i-th signal generator which produces the W-vector of step 306 (FIG. 3).

$$M_w = W^T W_y (W_y^T W_y)^{-1} \qquad \text{Eq. 11}$$

The column vectors of $W_y$ are the estimated W-vectors in step 308 (FIG. 3).

Next, the difference-surface is displayed over the EF-space, using the computer display 117 (FIG. 1) or some other method, so as to allow a qualitative visual judgment of the variations in the estimated signal-generator parameters with the model used. The user may make a judgment on the acceptability of the model solely on the basis of this display, or make a judgment from the results of step 502 (FIG. 5). For some users, this display will be sufficient, since the presence of any one of the following features in the display may be sufficient for a user to not accept a given result in a given model: 1) too large a difference-surface over most regions of the EF-space; 2) a smooth, but steeply-changing difference-surface; 3) a rough difference-surface, in which the gradient changes rapidly; 4) a rough difference-surface in which large differences occur between points that are closely-spaced in EF-space. Other features of the display may be of importance to users, after they have obtained experience in comparing the display with the specific model and signals they routinely analyze.

We now show the steps needed when both the signal-generator parameters and the W-vectors are unknown and the signal-matrix contains some time-points in which two or more signal-generators have a non-zero magnitude, in order to determine whether a given model, when analyzed with a given source analysis method, gives too great a variation in estimated signal-generator parameters when the given signal-matrix is analyzed. The steps are outlined in the flowchart of FIG. 4. Step 401 (FIG. 4) is the same as that of step 301 (FIG. 3). Step 402 (FIG. 4) is the same as that of step 302 (FIG. 3). In step 403 (FIG. 4), the unknown signal-generators are activated. This activation can occur by any of a plurality of means, depending upon the nature of the signal-generator, including, but not limited to, providing a sensory stimulus which will cause activity in some part of a bodily organ, or natural or random activation in which the activation of the activity of the signal-generator is detected by some means (such as another detectable event, or the absence of an event, or by a detection means placed near the signal), or time-locking a response to some external event such as a muscle movement, or time-locking a response to the absence of some usually-occurring event such as a muscle movement.

In step 403 (FIG. 4), the signals on the signal-channels are then recorded and stored. The signal can be any of a plurality of physical signals, including, but not limited to electrical potentials, magnetic-fields, and/or electrical-fields. The signals are recorded over a number of time-points, forming the signal-matrix. Storage of the signal-matrix can be by any of a plurality of methods, so long as the signal-matrix is available to the analysis computer during steps in which the signal-matrix is utilized. The apparatus or method of this embodiment of the invention requires that the signal-matrix is due to two or more signal-generators which are non-zero in at least part of the time-interval analyzed. If the recorded signals are from only a single signal-generator, then this embodiment of the invention cannot be directly applied, without combining signals from some other time-interval in which one or more other signal-generators are active, as described above with regard to FIG. 3. The recorded signal-matrix D is $N_{time} \times N_{chn}$, where $N_{time}$ is the number of time-points, and $N_{chn}$ the number of signal channels. In the presently-preferred mode, the time intervals analyzed are chosen so as to minimize the number of multiple signal-generators. This can be done in situations where signal-generators are only active for limited time-periods, by any of a plurality of means, including, but not limited to, shortening the time-interval that is analyzed.

Step 405 (FIG. 4) is the same as that of step 307 (FIG. 3). Another factor which might influence the number and location of points in EF-space used for computation is the intended use. If a model is used to analyze a recorded signal-matrix, D, then it predicts specific estimated signal-generator magnitudes. These estimated signal-generator magnitudes can be integrated according to the following equations (Eq.s 12) to yield a point in the EF-space.

$$E_{ij} = m_i m_j / (|m_i||m_j|) \quad (j > i = 1, 2, \ldots N)$$

$$F_j = |m_j|/|m_l| \quad (j=2,3,\ldots,N) \qquad \text{Eq. 12}$$

where $m_i = \{m_i(1), m_i(2), \ldots, m_i(N_{time})\}$ is the i-th signal generator's magnitude over time.

If it is important to the user to determine the possible effects of small changes in the signal-generator magnitudes (for example by disease, or due to manipulation of variables in an experiment), then points in the EF-space nearby to the point determined from the estimated signal-generator of the source analysis method analyzing D, in the model, as described in the preceding paragraph. Such considerations may affect the choice of spacing of points in EF-space. The choice of points to calculate in the EF-space may also be affected in other ways by the intended evaluation, as there are a plurality of ways to evaluate a given difference, as described for step 409 (FIG. 4).

Step 406 (FIG. 4) is required whenever the number of signal-generators and the signal-generator parameters are unknown, as well as when the signal-matrix contains time-points in which two or more signal-generators have a non-zero magnitude. Step 406 (FIG. 4) provides an estimate of the number of signal-generators, as well as determining the signal-space as a subspace of the channel-space. The signal-matrix D is decomposed by singular-value-decomposition or an equivalent method. Singular-value-decomposition decomposes D into $$D = U \Sigma V^T \qquad \text{Eq. 13}$$

where U has the same size as D, but with orthonormal columns. $\Sigma$ is an $N_{chn} \times N_{chn}$ diagonal matrix, with positive diagonal values arranged in decreasing order. V is an $N_{chn} \times N_{chn}$ orthonormal matrix. In the presently-preferred mode, the results from the singular-value-decomposition are next used to determine the dimensions of the signal space, which is less than the dimensions of the channel space of the signal-matrix D. In the presently-preferred mode, the orthogonal column vectors of V of Eq. 13 are selected on the basis of the diagonal values of $\Sigma$ of Eq. 13, so as to distinguish between signal and noise. The column vectors of V associated with large diagonal values of Σ are considered to be spanning the signal space, while the column vectors associated with small diagonal values are considered noise. If there are no clear distinctions between the diagonal values of Σ to distinguish the signal space from the noise, it may not be possible to use this invention satisfactorily. If there are clear distinctions, then the number of large diagonal values of Σ determines the number Q of orthogonal vectors that will be used in this procedure. The Q left-most column vectors in V of Eq. 13 form a $N_{chn} \times Q$ matrix $W_1$. Otherwise, the signal-space, and hence the matrix $W_1$ may be chosen by other means.

The number of signal-generators N must be determined and input by the keyboard or other input means. The number can be determined by any of a variety of methods, including, but not limited to, the user's past knowledge, analysis by singular-value-decomposition, interpretation of the data-point trajectory in channel-space, etc. The number N must be equal to or greater than Q. One example of when N may be larger than Q is when there are two spatially distinct signal-generators which have the same waveforms. If N is incorrect, this invention may show estimated signal-generator parameter variations that would be different if N were correct. The number N is then used to determine the size of the R matrix used in step 408 (FIG. 4), where the number of rows and columns in the R matrix are made equal to the number of generators, N. The analytical expressions of the components of the R matrix are derived as described in Eqs. 2 and 3. The components of the R matrix are functions of the E and F values only.

In step 407 (FIG. 4), the W-vector for each signal-generator is estimated. First, $W_1^T$ the transpose of $W_1$, is analyzed by the source analysis program, using the model to find the estimated signal-generator parameters $P_2$ for the N signal generators which will be used later in step 408 (FIG. 4). Associated with $P_2$ are N estimated W-vectors which form an $N_{chn} \times N$ matrix $W_2$. The source analysis method can be the same or different from that used in step 408 (FIG. 4), and might be the dipole source analysis method described by Scherg (supra), or de Munck (Electroenceph. clin. Neurophysiol. 77:156, 1990), among others. If the method of Mosher (supra) is used, then N must equal Q. Then, each estimated W-vector is projected onto the signal-space of D, i.e., projected onto the space spanned by the Q column vectors of $W_1$. The result are N W-vectors, forming an $N_{chn} \times N$ matrix $W_3$ which will be utilized in step 408 (FIG. 4). Mathematically, each W-vector is one column of the $W_3$ matrix, as follows:

$$W_3 = W_1(W_1^T W_1)^{-1} W_1^T W_2 \qquad \text{Eq. 14}$$

Step 408 (FIG. 4) is the same as step 308 (FIG. 3), except that in step 408 $P_2$ and $W_3$ are used in place of $P_1$ and W in step 308.

The calculations of the difference-surface in step 409 (FIG. 4) is the same as in step 309 (FIG. 3), the difference-surface being the differences between $P_x$ and $P_2$ for each point computed on the EF-space. The difference-surface is next displayed over the EF-space, using the computer display 117 (FIG. 1) or some other method, so as to allow a qualitative visual judgment of the types of variations in estimated signal-generator parameters that occur when E and F are varied. For some users, this display will be sufficient, since the presence of any one of the following features in the display may be sufficient for a user to not accept an estimated signal-generator parameter: 1) too large a variation in the difference-surface over the EF-space, or over the region of EF-space in which the EF-point for the analysis occurs; 2) a smooth, but steeply-changing difference-surface; 3) a rough difference-surface, in which the gradient changes rapidly; 4) a rough difference-surface in which large differences occur between points that are closely-spaced in EF-space. Other features of the display may be of importance to users, after they have obtained experience in comparing the display with the specific model and signal that they routinely analyze.

Moving now to FIG. 5, step 502 (FIG. 5) is to quantitatively evaluate the difference-surfaces created in step 309 (FIG. 3) or step 409 (FIG. 4), as shown in step 501 (FIG. 5). Such evaluation can be done by any of many methods, as chosen by the user. Generally, the goal is to arrive at some quantitative estimate of the degree to which the surface is flat, and/or with low errors. Listed here are some of the possible ways to quantify the EF-surface flat region (the first and fourth are presently-preferred modes): 1. Count the number of EF points below a certain difference level. 2. Compute the magnitude of the difference surface at a given percentile value. 3. Compute the mean and standard deviation of the difference surface over the EF space, or compute the median and quartiles. 4. Compute the Laplacian of the difference-surface over the EF-space, and count the number of EF points whose absolute value is less than a specified level. 5. Compute the mean and standard deviation of the Laplacian over the difference-surface, or compute the median and quartiles of the Laplacian over the difference-surface. 7. Fourier transform the difference-surface, then compute the low-frequency components as a percentage of all the components, or compute the difference between the low-frequency components and the other components. 8. Compute some combination of different difference-surfaces (e.g., location and magnitude differences combined with a weighting for the most important parameter).

After any of the above computations, or after other quantitative estimations, the results may be reported in any of a variety of methods, including visually, numerically, or go/no-go on some threshold criterion.

Figure 6:
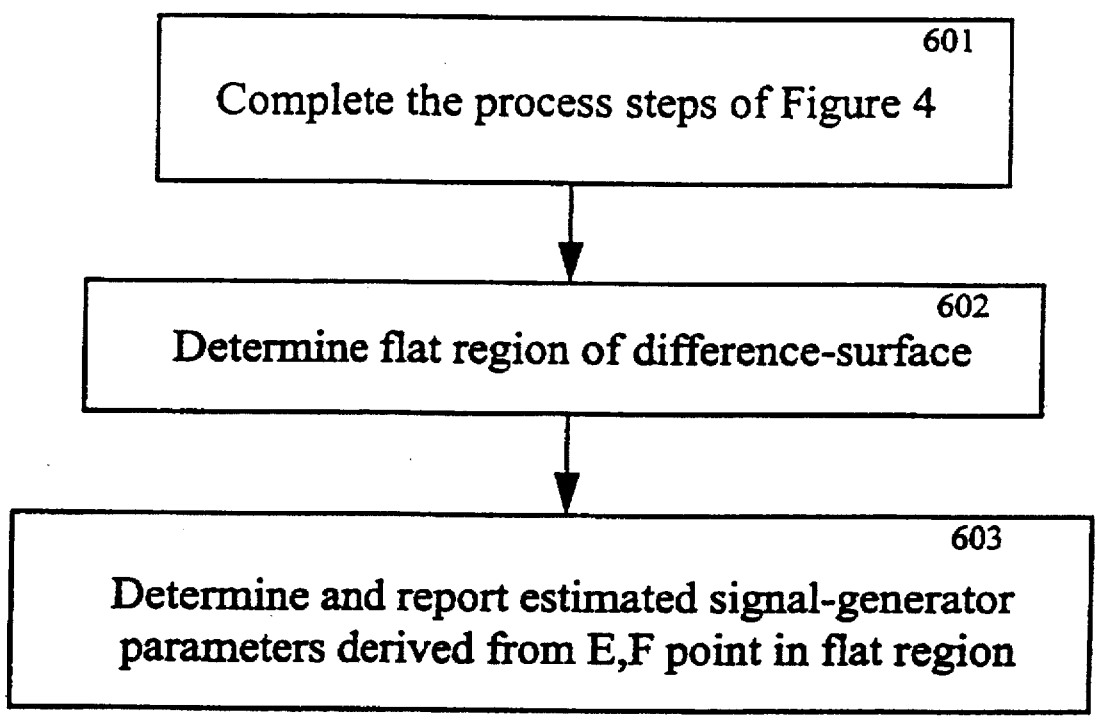
FIG. 6 shows a flowchart of the process steps used to improve estimation of the accuracy of signal-generator parameters in a given model.

The process steps of FIG. 6 illustrate a method to improve the accuracy of the estimated signal-generator parameters determined by a model. In step 607 (FIG. 6), the process steps of FIG. 4 are completed. Then, in the subsequent steps, the user may use the estimated signal-generator parameters on a flat portion of the difference surface, instead of the estimated signal-generator parameters found by the user's source analysis method analyzing the signal-matrix D directly. This is done by first determining the flat region of the difference-surface (step 602, FIG. 6) by any of a plurality of means, including those described in step 502 (FIG. 5). When a flat region is identified, then the estimated signal-generator parameters at one of the points on that region is used as the best estimation of that parameter. The estimated waveforms are obtained by projecting the recorded signal-matrix D onto $W_y$, where $W_y$ is an $N_{ch} \times N$ matrix formed by N estimated W-vectors at the current E,F point. Such a process is based upon the probability that the estimated signal-generator parameters at EF-point corresponding to the flat region of the difference-surface are more reliable measures of the correct signal-generator parameters, than are estimated signal-generator parameters within a rough or "mountainous" region. In another embodiment of this invention the estimated signal-generator parameters are found by using the point on the EF space in which all E-factors=0 and all F-factors=1. This process may be improved by normalizing the W-vectors, as previously described.

Examples of Operation.

An example of the use of an embodiment of this invention has been published in Zhang and Jewett (*Brain Topography,*

7:29, 1994), in which errors and difference-surfaces due to model misspecifications were studied, where the signal-matrix was due to dipoles in a 3-shell sphere, and the models were 3-shell spheres with incorrect conductivities and/or incorrect shell thicknesses. An example of the method of determining the W-vectors by a combination of a model and a projection into the signal-space determined by singular-value-decomposition is given in this same paper.

Another example of an embodiment of this invention was published in Zhang, Jewett and Goodwill (supra), which shows the results of the process steps of FIG. 3. System context of the invention.

The present invention may be implemented by a hard-wired apparatus, or by using a special-purpose computer constructed by programming a general-purpose computer to perform particular functions, as described herein, pursuant to instructions from program software stored in memory. In some embodiments, the present invention can be implemented using an International Business Machines computer IBM RS/6000, model 530, with 64 MB random access memory, and 2.3 GB hard disk space, running the operating system IBM AIX Version 3 for the RISC System/6000, using source code compiled by the AIX XL Fortran compiler and the AIX XL C compiler. The hardware is described in IBM RISC System/6000 Technology, IBM Product Design and Development Advanced Workstations Division, IBM Corp., 1990, publication SA23-2619. The operating system is described in AIX General Concepts and Procedures for RISC System/6000, IBM Corp., Fourth Edition, 1992. The Fortran compiler is described in AIX XL Fortran Compiler/6000 User's Guide Version 2.2, IBM Corp., 1991. Publication SC09-1354-01. The C compiler is described in XL C Reference Manual, IBM Corp., Fourth Edition, 1992. Other embodiments could use other computers, including smaller machines such as those incorporating the Intel 80486 processor.

While the invention has been described with respect to specific hardware and software, it should be understood that alternative general or specific purpose computing equipment, and other software, or hardwired logic circuitry could be used in practicing the invention.

Although the present invention has been described in considerable detail with reference to certain preferred versions thereof, other versions are possible. Therefore, the spirit and scope of the appended claims should not be limited to the description of the preferred versions contained herein.

We claim:

1. An apparatus for determining variations in estimated signal-generator parameters of a plurality of signal-generators, said signal-generators causing signals at a plurality of physical locations, said signals having magnitudes, said signals being sensed at one or more selected points in time, said apparatus comprising:
   (a) means for sensing said signals at at least one of said physical locations;
   (b) storing means coupled to said sensing means for storing the magnitudes of said signals at least one point in time;
   (c) variation means associated with said storing means for generating variation in the estimated signal-generator parameters from said stored magnitudes, wherein variation in estimated signal-generator parameters is determined by variations in E and F factors from an EF-space; and,
   (d) outputting means for outputting the estimated signal-generator parameters and the variations in the estimated signal generator parameters.

2. The apparatus of claim 1, further comprising a display coupled to said outputting means.

3. The apparatus of claim 1, wherein said outputted variations of signal-generator parameters are converted into one or more stored difference-surfaces.

4. The apparatus of claim 3, further comprising means to display said stored difference surfaces.

5. The apparatus of claim 3, further comprising means for performing a numerical analysis of said stored difference-surfaces, and means for generating output of results of the numerical analysis.

6. The apparatus of claim 1, further comprising means for estimating the signal-generator parameters from one or more points of the EF-space.

7. The apparatus of claim 6, further comprising means for performing a numerical method to determine a flat region of the difference-surface, and means for choosing an E,F point in the flat region to estimate the signal generator parameters at said E,F point.

8. The apparatus of claim 6, further comprising means for estimating the signal-generator parameters from the point of the EF-space in which all E-factors are zero and all the F-factors are one.

9. A method for determining variations in the estimated signal-generator parameters of a plurality of signal-generators, said signal-generators causing signals at a plurality of physical locations, said signals having magnitudes being sensed at one or more selected points in time, said method comprising:
   (a) sensing said signals at at least one of said physical locations;
   (b) storing an input of magnitudes of the signals at, at least, one point in time;
   (c) determining variations in estimated signal-generator parameters; wherein the step of determining variations in estimated signal-generator parameters is performed by varying E and F factors from EF-space; end,
   (d) outputting the estimated signal generator parameters and the variations of the estimated signal-generator parameters.

10. The method of claim 9, wherein the outputting step comprises displaying the output.

11. The method of claim 9, wherein said outputted variations of signal-generator parameters are converted into one or more stored difference-surfaces.

12. The method of claim 11, wherein the outputting step comprises displaying said stored difference-surface.

13. The method of claim 11, further comprising evaluating said stored difference-surfaces by numerical analysis of said stored difference-surface, and outputting said numerical analysis.

14. The method of claim 9, further comprising estimating signal-generator parameters from one or more points of the EF-space.

15. The method of claim 14, wherein the step of choosing the E-factors and F-factors comprises computing by a numerical method a flat region of the difference-surface, and then using the E-factor and F-factor at a point in the flat region to estimate signal-generator parameters.

16. The method of claim 14, wherein the step of choosing the E-factors and F-factors comprises estimating signal-generator parameters from the point of the EF-space in which all E-factors are zero and all the F-factors are one.

17. An apparatus for evaluating a given computational model by determining variations in estimated signal-generator parameters of a plurality of signal-generators, said signal-generators causing signals at a plurality of physical locations, said signals having magnitudes and a signal space, said signals having magnitudes being sensed at one or more selected points in time, said apparatus comprising:

(a) means for sensing said signals at at least two of said physical locations;

(b) storing means coupled to said sensing means for storing the magnitudes of said signals at at least one point in time;

(c) variation means associated with said storing means for estimating a first set of signal-generator parameters using said stored signal magnitudes and said given computational model,
wherein said first set of estimated signal-generator parameters include a set of weighting functions;

(d) first estimating means associate with said variation means for estimating the signal space from said signal;

(e) correcting means associated with said first estimating means for projecting said first set of weighting functions onto said signal space to yield a second, corrected set of weighting functions;

(f) means associated with said correcting means for selecting an E,F point;

(g) construction means associated with said selecting means for constructing magnitude functions corresponding to said E,F point;

(h) generating means associated with said construction means for generating a second signal from said second set of weighting functions and said magnitude functions;

(i) second estimating means associated with said generating means for estimating a second set of signal-generator parameters using said second generated signal and said given computational model;

(j) difference means associated with said first estimating means and said second estimating means for computing the difference between said first set of signal-generator parameters and said second set of signal-generator parameters.

18. The apparatus according to claim 17 further comprising display means associated with said difference means for displaying said difference between said first set of signal-generator parameters and said second set of signal-generator parameters.

19. The apparatus according to claim 17 further comprising:

(k) means for selecting a plurality of E,F points to generate a plurality of sets of signal-generator parameters; and, (l) means for storing each of the differences between said first set of signal generator parameters and each of said plurality of sets of signal-generator parameters.

20. The apparatus according to claim 19, further comprising means associated with said difference means for displaying each of said differences between said first set of signal generator parameters and each of said plurality of sets of signal-generator parameters.

21. The apparatus according to claim 20, wherein said means for displaying each of said differences between said first set of signal generator parameters and each of said plurality of sets of signal-generator parameters displays a difference surface over an E,F plane.

22. The apparatus for estimating signal-generator parameters according to claim 21, further comprising:

(a) means for locating a flat region on said difference surface;

(b) means for selecting an E,F point within said flat region; and, (c) means for estimating signal-generator parameters using said E,F point.

23. An apparatus of claim 17 for estimating signal-generator parameters, wherein said means for selecting an E,F point comprises means for setting all E-factors to zero and all F-factors to one.

24. An method for evaluating a given computational model by determining variations in estimated signal-generator parameters of a plurality of signal-generators, said signal-generators causing signals at a plurality of physical locations, said signals having magnitudes and a signal space, said signals having magnitudes being sensed at one or more selected points in time, said method comprising:

(a) sensing said signals at at least two of said physical locations;

(b) storing the magnitudes of said signals at at least one point in time;

(c) estimating a first set of signal-generator parameters using said stored signal magnitudes and said given computational model,
wherein said first set of estimated signal-generator parameters includes a set of weighting functions;

(d) estimating the signal space from said signal;

(e) projecting said first set of weighting functions onto said signal space to yield a second, corrected set of weighting functions;

(f) selecting an E,F point;

(g) constructing magnitude functions corresponding to said E,F point;

(h) generating a second signal from said second set of weighting functions and said magnitude functions;

(i) estimating a second set of signal-generator parameters using said second generated signal and said given computational model;

(j) computing the difference between said first set of signal-generator parameters and said second set of signal-generator parameters.

25. The method according to claim 24 further comprising displaying said difference between said first set of signal-generator parameters and said second set of signal-generator parameters.

26. The method according to claim 24 further comprising:

(k) selecting a plurality of E,F points to generate a plurality of sets of signal-generator parameters; and, (l) storing each of the differences between said first set of signal generator parameters and each of said plurality of sets of signal-generator parameters.

27. The method according to claim 26, further comprising displaying each of said differences between said first set of signal generator parameters and each of said plurality of sets of signal-generator parameters.

28. The method according to claim 27, wherein displaying each of said differences between said first set of signal generator parameters and each of said plurality of sets of signal-generator parameters comprises displaying a difference surface over an E,F plane.

29. The method for estimating signal-generator parameters according to claim 28, further comprising:

(a) locating a flat region on said difference surface;

(b) selecting an E,F point within said flat region; and, (c) estimating signal-generator parameters using said E,F point.

30. An method of claim 24 for estimating signal-generator parameters, wherein said means for selecting an E,F point comprises means for setting all E-factors to zero and all F-factors to one.

31. An apparatus for evaluating a given computational model by determining variations in estimated signal-generator parameters of a plurality of signal-generators, said signal-generators causing signals at a plurality of physical locations, said signals having magnitudes and a signal space, said signals having magnitudes being sensed at one or more selected points in time, said apparatus comprising:

(a) sensing means for sensing said signals at at least two of said physical locations;

(b) storing means associated with said sensing means for storing the magnitudes of said signals at at least one point in time;

(c) estimating means associated with said storing means for estimating a first set of signal-generator parameters using said stored signal magnitudes and said given computational model,
wherein said first set of estimated signal-generator parameters includes a set of weighting functions corresponding to said estimated signal generator parameters and said physical locations;

(d) correcting means associated with said estimating means for correcting the estimated signal generator parameters based upon the said stored signal magnitudes to generate a second set of weighting functions;

(e) manipulating means associated with said correcting means for manipulating said magnitude functions of said corrected signal generator parameters to generate a second signal from said second set of weighting functions and said manipulated magnitude functions;

(f) second estimating means associated with said manipulating means for estimating a second set of signal-generator parameters using said second generated signal and said given computational model;

(g) difference means associated with said first and second estimating means for computing the difference between said first set of signal-generator parameters and said second set of signal-generator parameters.

32. The apparatus of claim 31 wherein said difference means comprises means for computing the difference between said first corrected set of signal-generator parameters and said second set of signal-generator parameters.

33. A method for evaluating a given computational model by determining variations in estimated signal-generator parameters of a plurality of signal-generators, said signal-generators causing signals at a plurality of physical locations, said signals having magnitudes and a signal space, said signals having magnitudes being sensed at one or more selected points in time, said method comprising:

(a) sensing said signals at at least two of said physical locations;

(b) storing the magnitudes of said signals at at least one point in time;

(c) estimating a first set of signal-generator parameters using said stored signal magnitudes and said given computational model,
wherein said first set of estimated signal-generator parameters includes a set of weighting functions corresponding to said estimated signal generator parameters and said physical locations;

(d) correcting the estimated signal generator parameters based upon the said stored signal magnitudes to generate a second set of weighting functions;

(e) manipulating said magnitude functions of said corrected signal generator parameters to generate a second signal from said second set of weighting functions and said manipulated magnitude functions;

(f) estimating a second set of signal-generator parameters using said second generated signal and said given computational model;

(g) computing the difference between said first set of signal-generator parameters and said second set of signal-generator parameters.

34. The method of claim 33 wherein computing the difference comprises computing the difference between said first corrected set of signal-generator parameters and said second set of signal-generator parameters.

* * * * *